(12) United States Patent
Golestan Irani

(10) Patent No.: US 10,983,526 B2
(45) Date of Patent: Apr. 20, 2021

(54) METHOD AND SYSTEM FOR GENERATING A SEMANTIC POINT CLOUD MAP

(71) Applicant: Keyvan Golestan Irani, Newmarket (CA)

(72) Inventor: Keyvan Golestan Irani, Newmarket (CA)

(73) Assignee: Huawei Technologies Co., Ltd., Shenzhen (CN)

(*) Notice: Subject to any disclaimer, the term of this patent is extended or adjusted under 35 U.S.C. 154(b) by 152 days.

(21) Appl. No.: 16/133,310

(22) Filed: Sep. 17, 2018

(65) Prior Publication Data

US 2020/0089251 A1    Mar. 19, 2020

(51) Int. Cl.

| | |
|---|---|
| *G05D 1/02* | (2020.01) |
| *G05D 1/00* | (2006.01) |
| *G10L 15/26* | (2006.01) |
| *G10L 15/08* | (2006.01) |
| *G01C 21/32* | (2006.01) |
| *G06F 3/16* | (2006.01) |
| *G06F 16/29* | (2019.01) |
| *G06F 40/30* | (2020.01) |

(52) U.S. Cl.
CPC ........... *G05D 1/0246* (2013.01); *G01C 21/32* (2013.01); *G05D 1/0088* (2013.01); *G06F 3/167* (2013.01); *G06F 16/29* (2019.01); *G06F 40/30* (2020.01); *G10L 15/08* (2013.01); *G10L 15/26* (2013.01); *G05D 2201/0213* (2013.01); *G10L 2015/088* (2013.01)

(58) Field of Classification Search
CPC ...................................................... G06F 40/30
See application file for complete search history.

(56) References Cited

U.S. PATENT DOCUMENTS

| | | | |
|---|---|---|---|
| 2013/0030811 A1 | 1/2013 | Olleon et al. | |
| 2014/0361973 A1 | 12/2014 | Raux et al. | |
| (Continued) | | | |

FOREIGN PATENT DOCUMENTS

| | | |
|---|---|---|
| CN | 106409283 A | 2/2017 |
| CN | 108098796 A | 6/2018 |
| CN | 108345822 A | 7/2018 |

OTHER PUBLICATIONS

Ontology-Based Driving Decision Making: A Feasibility Study at Uncontrolled Intersections Zhao et al., Jul. 7, 2017, IEICE Trans. Inf. & Syst., vol. E100-D, No. 7, pp. 1425-1439 (Year: 2017).*

(Continued)

*Primary Examiner* — Thomas E Worden

(57) ABSTRACT

A method and system for generating a semantic point cloud map. Voice input is received via a microphone and converted into text via speech-to-text synthesis. The text is decomposed into semantic data comprising a number of words, and it is determined whether keywords of the semantic data are present in an autonomous driving (AD) ontology. In response to the keywords of the semantic data being present in the AD ontology, coordinates of a point cloud map corresponding to the semantic data are determined. An association between a semantic label determined from the words of the semantic data and coordinates in the point cloud map corresponding to the semantic data is generated and stored in a memory of the computer vision system.

19 Claims, 8 Drawing Sheets

(56) References Cited

U.S. PATENT DOCUMENTS

| | | | | |
|---|---|---|---|---|
| 2018/0174446 A1* | 6/2018 | Wang | .................... | G08G 1/017 |
| 2019/0043500 A1* | 2/2019 | Malik | ................ | H04N 21/2353 |
| 2019/0213790 A1* | 7/2019 | Taguchi | ............ | G01C 21/3673 |
| 2019/0392035 A1* | 12/2019 | Indenbom | ............. | G06F 40/284 |
| 2020/0051252 A1* | 2/2020 | Brown | ...................... | G06T 7/74 |
| 2020/0320777 A1* | 10/2020 | Meshry | ................ | G06N 3/082 |

OTHER PUBLICATIONS

Aldo Gangemi, Valentina Presutti, Diego Reforgiato Recupero, Andrea Giovanni Nuzzolese, Francesco Draicchio, and Misael Mongiovi, Semantic Web Machine Reading with FRED, Semantic Web 0, Jan. 21, 2016, http://semantic-web-journal.org/system/files/swj1379.pdf.

FRED: Machine Reading for the Semantic Web, at least as early as Jul. 2018, http://wit.istc.cnr.it/stlab-tools/fred/.

* cited by examiner

METHOD AND SYSTEM FOR GENERATING A SEMANTIC POINT CLOUD MAP

TECHNICAL FIELD

The present disclosure relates to computer vision and spatial cognition, and in particular, to a method and system for generating a semantic point cloud map.

BACKGROUND

Vehicle driver assistance systems that enhance the awareness and safety of human drivers and autonomous vehicles increase driver safety and convenience. Autonomous parking and driving are important aspects of autonomous vehicles. However, as with other aspects of autonomous vehicles, autonomous operations such as autonomous parking and driving remain a developing field and improvements in autonomous parking and driving are desirable.

Computer vision systems are an important component of a vehicle driver assistance systems and autonomous vehicles. Computer vision systems typically generate a point cloud map as part of spatial cognition. A point cloud is a large set of data points in a coordinate system, typically a three-dimensional (3D) coordinate system. Each data point in the point cloud has three (3) coordinates namely x, y, and z, which determine where the point is located along x, y, and z axes of the 3D coordinate system, respectively. One of the most accurate and common sources of point clouds, in particular in the autonomous driving domain, are laser-based imagery sensors, such as Light Detection and Ranging (LiDAR) sensor. A LiDAR usually operates in a fixed frequency, and generates a very large set of data points (e.g., 100,000 data points per 100 ms in Velodyne™ HDL-64E) in its local coordinate system, which is the center of LiDAR sensor.

LiDAR point clouds may be used in point cloud map generation. Point cloud map generation involves moving a scanning LiDAR around an environment (i.e., driving a LiDAR-equipped car in a neighborhood), collecting all the point clouds generated by the LiDAR, and combining the generated point clouds together to generate point cloud map. The generated point cloud map includes a larger set of 3D data points than a conventional point cloud and has extended boundaries. Point cloud maps may be utilized for map-based vehicle localization in vehicle driver assistance systems or autonomous vehicles during autonomous driving.

Conventional methods of generating point cloud maps do not provide any context. Improvements in computer vision systems and alternatives to existing solutions which provide context to the point cloud maps are desirable.

SUMMARY

Semantic information is information about the environment and the objects within the environment that has meaning for humans. Semantic information may comprise object labels, such as names, object properties such as color or size, and/or relationships between objects in the environment. The object labels are referred to hereinafter as semantic labels. Sematic information improves drivers' understanding of the environment which ultimately leads to better map-based vehicle localization and place recognition. However, conventional point cloud maps do not contain semantic information.

Semantic data is structured data upon which semantic information is based. For example, the semantic information that "The big red building on the right is Rachel's school" is based on semantic data including the terms "big", "red" and "building" describing properties of an object "Rachel's school", and "on the right" is a relation that connects the object "Rachel's school" to the surrounding environment. One of the most common and important cognitive sources of semantic information, which is also relatively easy to obtain within autonomous vehicles, is semantic information generated by humans through a spoken language. Human-provided sematic information can be in the form of voice inputs and the voice inputs can be translated into text by speech-to-text synthesis. This text is called soft data in the data fusion community. However, soft data is unstructured data by nature and is at a different dimension than sensor data acquired by sensors. Therefore, associating (e.g., combining or fusing) the soft data with the data points in a point cloud map is a challenging task because the soft data and the data points in the point cloud map are in two different domains. The present disclosure provides a method and system which receives soft data and generates semantic data from the soft data which is in the same domain as the sensor data so that the soft data can be associated with (e.g., fused or combined) with the sensor data. In some examples, soft data about the environment is acquired by a human-machine interface (HMI) device. The soft data is processed into semantic data in the form of a resource description framework (RDF) triplet using natural language processing (NLP) and an ontology. The semantic data is then associated with (e.g. fused or combined) with a set of data points of a point cloud map to provide a semantic point cloud map.

In accordance with aspects of the present disclosure, there is provided a method and system for generating a semantic point cloud map. In the autonomous driving (self-driving vehicle) domain, conventional vehicle localization methods, such as LiDAR based vehicle localization methods, cannot accurately localize the vehicle in an environment due to lack of spatial features in the environment. Further, existing sources of semantic information are typically limited in scope and associated with imprecise location data. The present disclosure provides a method and system for semantically labeling some of the data points in a point cloud map, such as a LiDAR-based point cloud map, to help improve localization accuracy. The present disclosure leverages a recognition by the Applicant that humans present in a vehicle are one of the most reliable sources of semantic information including semantic labels. Thus, the present disclosure uses soft data in the form of observations generated from human inputs as well as semantic relations between various parts of data that flows within the self-driving system as the source of the semantic labels.

The semantic point cloud map generated by the present disclosure provides a higher-level dimension than merely 3D spatial coordinates, and enhances an autonomous vehicle's understanding of the current environment, which leads to better vehicle localization in cases where usual low-level features are of little assistance (e.g., indoor areas such as covered parking lots). The present disclosure also allows customization of a point cloud map based on the semantic information including semantic labels which may be helpful in adapting the autonomous vehicle for a particular user population, such as a particular demographics which may vary based on localization or consumer/brand preferences. Lastly, the semantic point cloud map improves the understanding of the environment, which can further be used by other modules of autonomous vehicles, such as perception or planning.

In accordance with one aspect of the present disclosure, there is provided a method of generating a semantic point cloud map. Voice input is received via a microphone and converted into text via speech-to-text synthesis. The text is decomposed into semantic data comprising a number of words, and it is determined whether keywords of the semantic data are present in an autonomous driving (AD) ontology. In response to the keywords of the observation being present in the AD ontology, coordinates of a point cloud map corresponding to the semantic data are determined. An association between a semantic label determined from the words of the semantic data and coordinates in the point cloud map corresponding to the semantic data is generated and stored in a memory of the computer vision system.

In accordance with another aspect of the present disclosure, there is provided a computer vision system. The computer vision system comprises a processor system, a memory coupled to the processor system, and a plurality of sensors coupled to the processor system, the plurality of sensors configured to sense an environment surrounding a vehicle carrying the computer vision system. The memory has tangibly stored thereon executable instructions that, when executed by the processor system, cause the computer vision system to perform the methods described above and herein.

In accordance with a further aspect of the present disclosure, there is provided a vehicle control system for a vehicle. The vehicle control system comprises a computer vision system, the computer vision system having the features described above and herein.

In accordance with a further aspect of the present disclosure, there is provided a vehicle comprising a mechanical system for moving the vehicle, a drive control system coupled to the mechanical system for controlling the mechanical system and a vehicle control system coupled to the drive control system, the vehicle control system having the features described above and herein.

In accordance with a yet further aspect of the present disclosure, there is provided a non-transitory machine readable medium having tangibly stored thereon executable instructions for execution by a processor system of a computer vision system having the features described above and herein. The executable instructions, when executed by the processor system, cause the computer vision system to perform the methods described above and herein.

DESCRIPTION OF EXAMPLE EMBODIMENTS

The following is a list of selected acronyms and associated definitions that appear in this description:
LiDAR Light Detection and Ranging
AD Autonomous Driving
PC-ACQ Point Cloud Map Acquisition
HD-ACQ Hard Data Acquisition
SD-ACQ Soft Data Acquisition
SD-VAL Soft Data Validation
SD-EXT Soft Data Extraction
SHD-ASC Soft/Hard Data Association
NLP Natural Language Processing
ICP Iterative Closest Point The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems with reference to a motor vehicle, such as a car, truck, bus, boat or ship, submarine, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in mobile robot vehicles including, but not limited to, autonomous vacuum cleaners, rovers, lawn mowers, unmanned aerial vehicle (UAV), and other objects.

Figure 1:
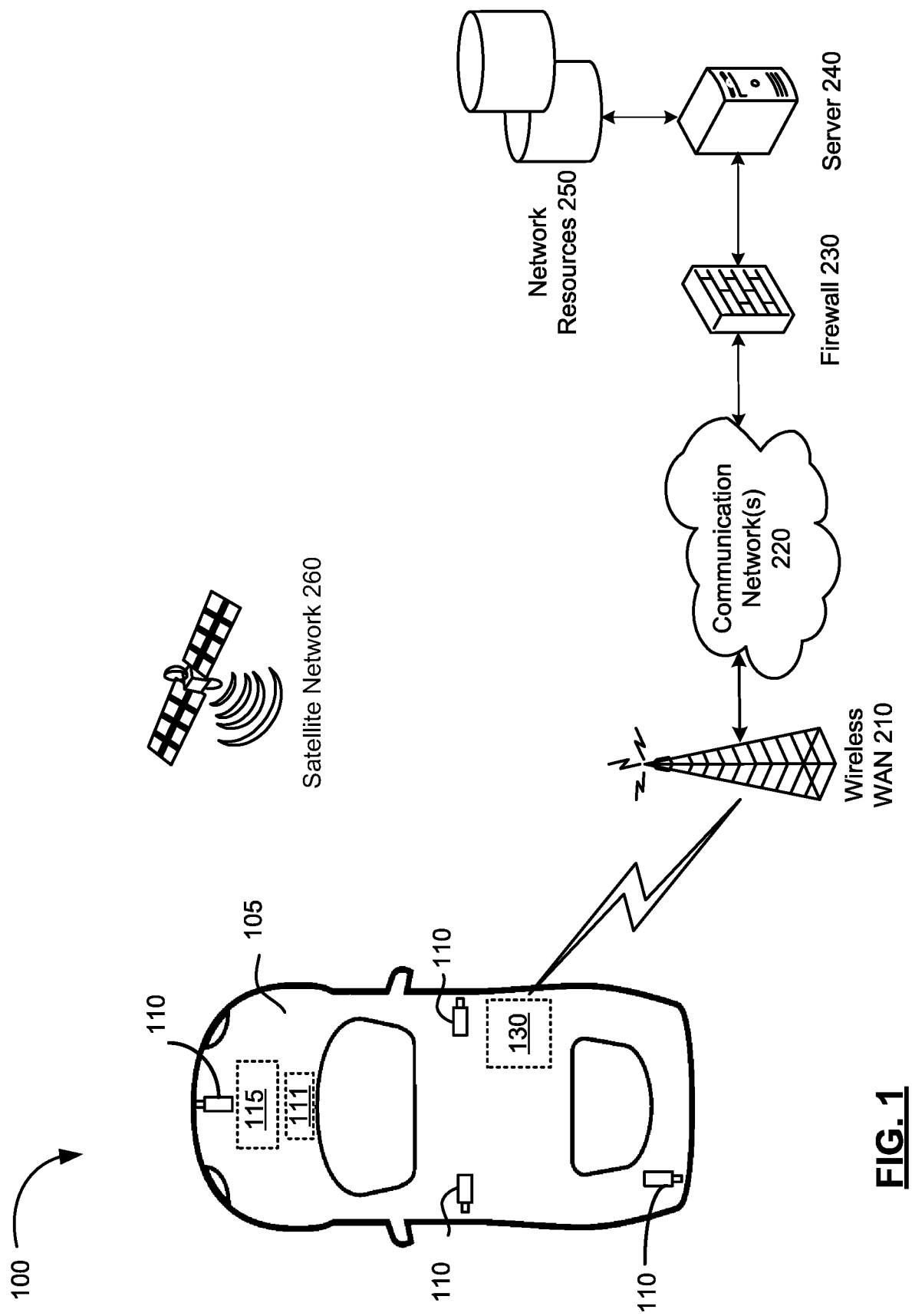
FIG. 1 is a schematic diagram of a communication system suitable for practicing example embodiments of the present disclosure.
Figure 2:
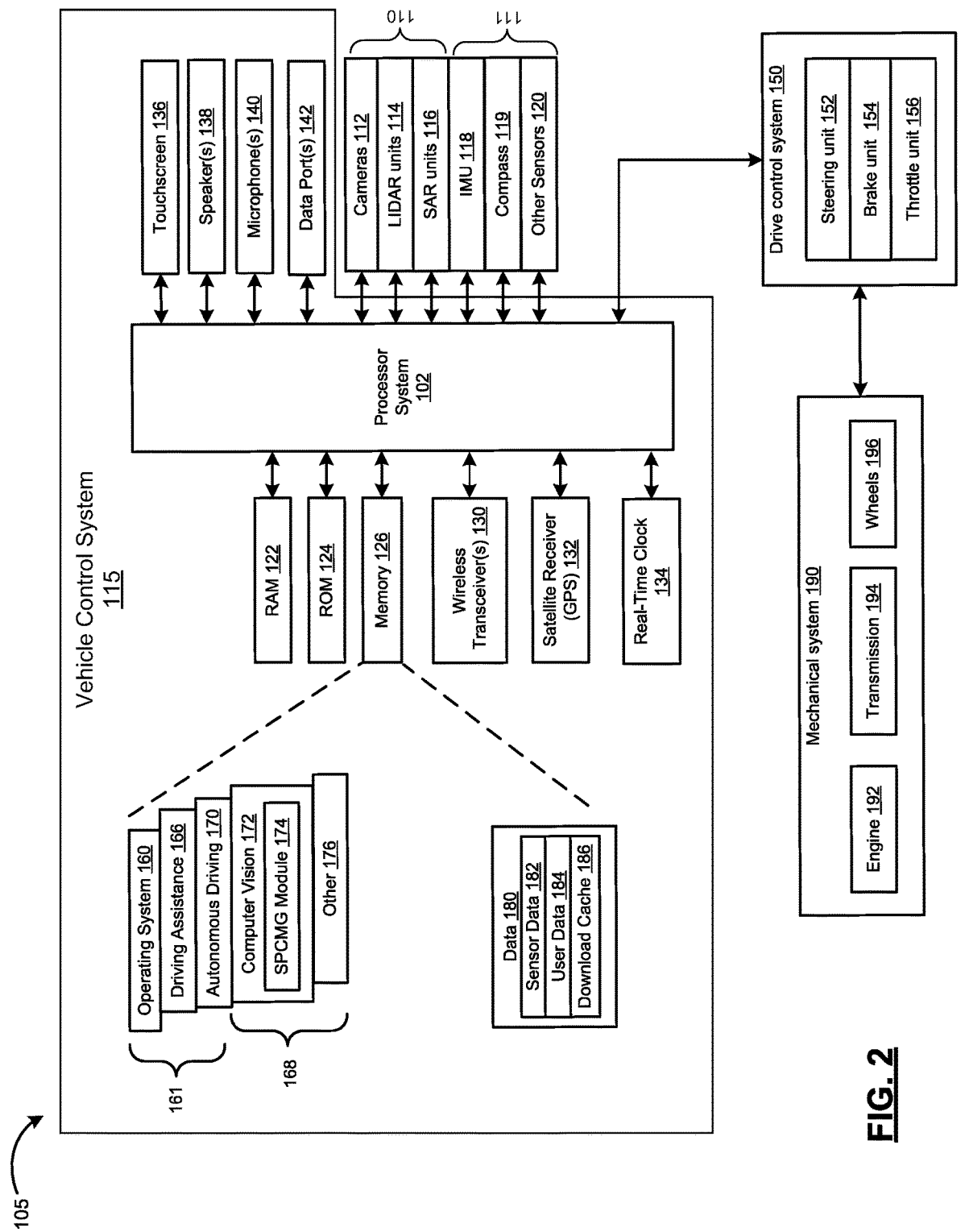
FIG. 2 is a block diagram of a vehicle comprising a vehicle control system in accordance with one example embodiment of the present disclosure.

FIG. 1 is a schematic diagram showing selected components of a system 100 in accordance with one example embodiment of the present disclosure. The system 100 comprises user equipment in the form of a vehicle control system 115 embedded in vehicles 105 (only one of which is shown in FIG. 1). The vehicle control system 115, shown in greater detail in FIG. 2, is coupled to a drive control system 150 and a mechanical system 190 of the vehicle 105, as described below. The vehicle control system 115 can in various embodiments allow the vehicle 105 to be operable in one or more of a fully-autonomous, semi-autonomous or fully user-controlled mode.

The vehicle 105 includes a plurality of electromagnetic (EM) wave based sensors 110 that collect data about the external environment surrounding vehicle 105, and a plurality of vehicle sensors 111 that collect data about the operating conditions of the vehicle 105. EM wave based sensors 110 may for example include digital cameras 112 that provide a computer vision system, light detection and ranging (LiDAR) units 114, and radar units such as synthetic aperture radar (SAR) units 116. Cameras 112, LiDAR units 114 and SAR units 116 are located about the vehicle 105 and are each coupled to the vehicle control system 115, as described below. In an example embodiment, the cameras 112, LiDAR units 114 and SAR units 116 are located at the front, rear, left side and right side of the vehicle 105 to capture data about the environment in front, rear, left side and right side of the vehicle 105. The cameras 112, LiDAR units 114 and SAR units 116 are mounted or otherwise located to have different fields of view (FOVs) or coverage areas to capture data about the environment surrounding the vehicle 105. In some examples, the FOVs or coverage areas of some or all of the adjacent EM wave based sensors 110 are partially overlapping. Accordingly, the vehicle control system 115 receives data about the external environment of the vehicle 105 as collected by cameras 112, LiDAR units 114 and SAR units 116.

Vehicle sensors 111 can include inertial measurement unit (IMU) 118, an electronic compass 119, and other vehicle sensors 120 such as a speedometer, a tachometer, wheel traction sensor, transmission gear sensor, throttle and brake position sensors, and steering angle sensor. The vehicle sensors 111, when active, repeatedly (e.g., in regular intervals) sense the environment and provide sensor data based on environmental conditions to the vehicle control system 115 in real-time or near real-time. The vehicle sensors 111 can include an IMU 118 that senses the vehicle's specific force and angular rate using a combination of accelerometers and gyroscopes. The vehicle control system 115 may collect data about a position and orientation of the vehicle 105 using signals received from a satellite receiver 132 and the IMU 118. The vehicle control system 115 may determine a linear speed, angular speed, acceleration, engine RPMs, transmission gear and tire grip of the vehicle 105, among other factors, using data from one or more of the satellite receivers 132, the IMU 118, and the vehicle sensors 111.

The vehicle control system 115 may also comprise one or more wireless transceivers 130 that enable the vehicle control system 115 to exchange data and optionally voice communications with a wireless wide area network (WAN) 210 of the communication system 100. The vehicle control system 115 may use the wireless WAN 210 to access a server 240, such as a driving assist server, via one or more communications networks 220, such as the Internet. The server 240 may be implemented as one or more server modules in a data center and is typically located behind a firewall 230. The server 240 is connected to network resources 250, such as supplemental data sources that may be used by the vehicle control system 115.

The communication system 100 comprises a satellite network 260 comprising a plurality of satellites in addition to the WAN 210. The vehicle control system 115 comprises the satellite receiver 132 (FIG. 2) that may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

FIG. 2 illustrates selected components of the vehicle 105 in accordance with an example embodiment of the present disclosure. As noted above, the vehicle 105 comprises a vehicle control system 115 that is connected to a drive control system 150 and a mechanical system 190 as well as to the EM wave based sensors 110, and the vehicle sensors 111. The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processor system 102 that is coupled to a plurality of components via a communication bus (not shown) which provides a communication path between the components and the processor system 102. The processor system 102 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from the satellite network 260, a real-time clock 134, and a touchscreen 136. The processor system 102 may include one or more processing units, including for example one or more central processing units (CPUs), one or more graphical processing units (GPUs) and other processing units.

The one or more wireless transceivers 130 may comprise one or more cellular (RF) transceivers for communicating with a plurality of different radio access networks (e.g., cellular networks) using different wireless data communication protocols and standards. The vehicle control system 115 may communicate with any one of a plurality of fixed transceiver base stations (one of which is shown in FIG. 1) of the wireless WAN 210 (e.g., cellular network) within its geographic coverage area. The one or more wireless transceiver(s) 130 may send and receive signals over the wireless WAN 210. The one or more wireless transceivers 130 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 130 may also comprise a short-range wireless transceiver, such as a Bluetooth® transceiver, for communicating with a mobile computing device, such as a smartphone or tablet. The one or more wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 134 may comprise a crystal oscillator that provides accurate real-time time data. The time data may be periodically adjusted based on time data received through satellite receiver 132 or based on time data received from network resources 250 executing a network time protocol.

The touchscreen 136 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor system 102 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The drive control system 150 serves to control movement of the vehicle 105. The drive control system 150 comprises a steering unit 152, a brake unit 154 and a throttle (or acceleration) unit 156, each of which may be implemented as software modules or control blocks within the drive control system 150. The steering unit 152, brake unit 154 and throttle unit 156 process, when in fully or semi-autonomous driving mode, receives navigation instructions from an autonomous driving system 170 (for autonomous driving mode) or a driving assistance system 166 (for semi-autonomous driving mode) and generates control signals to control one or more of the steering, braking and throttle of the vehicle 105. The drive control system 150 may include additional components to control other aspects of the vehicle 105 including, for example, control of turn signals and brake lights.

The mechanical system 190 receives control signals from the drive control system 150 to operate the mechanical components of the vehicle 105. The mechanical system 190 effects physical operation of the vehicle 105. The mechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor system 102. A user may interact with the GUI using the touchscreen and optionally other input devices (e.g., buttons, dials) to select a driving mode for the vehicle 105 (e.g. fully autonomous driving mode or semi-autonomous driving mode) and to display relevant data and/or information, such as navigation information, driving information, parking information, media player information, climate control information, etc. The GUI may comprise a series of traversable content-specific menus.

The memory 126 of the vehicle control system 115 has stored thereon a plurality of software systems 161 in addition to the GUI, where each software system 161 includes instructions that may be executed by the processor system 102. The software systems 161 include an operating system 160, the driving assistance software system 166 for semi-autonomous driving, and the autonomous driving software system 170 for fully autonomous driving. Both the driving assistance software system 166 and the autonomous driving software system 170 can include one or more of a navigation planning and control module, a vehicle localization module, parking assistance module, and autonomous parking module. The memory 126 also has stored thereon software modules 168 that can be invoked by either the driving assistance software system 166 or the autonomous driving software system 170. The software modules 168 include a computer vision module 172, which in combination with the EM wave based sensors 110, provide a computer vision system 300 (FIG. 3), and other modules 176. The computer vision module 172 includes a semantic point cloud map generating (SPCMG) module 174, the operation of which is described in detail below. Other modules 176 include for example mapping module, navigation module, climate control module, media player module, telephone module and messaging module. The SPCMG module 174, when executed by the processor system 102, causes the operations of methods described herein to be performed.

Although the SPCMG module 174 is shown as a separate module that can be invoked by the driving assistance software system 166 for semi-autonomous driving and/or the autonomous driving software system 170, one or more of the software modules 168, including the SPCMG module 174, may be combined with one or more of the other modules 176 in some embodiments.

The memory 126 also stores a variety of data 180. The data 180 may comprise sensor data 182 sensed by the EM wave based sensors 110, user data 184 comprising user preferences, settings and optionally personal media files (e.g., music, videos, directions, etc.), and a download cache 186 comprising data downloaded via the wireless transceivers 130, including for example data downloaded from network resources 250. The sensor data 182 may comprise image data from the cameras 112, LiDAR data from the LiDAR units 114, RADAR data from the SAR units 116, and other sensor data from other vehicle sensors 120. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data and/or information. Data received by the vehicle control system 115 may also be stored in the RAM 122. Although specific functions are described for various types of memory, this is merely one example, and a different assignment of functions to types of memory may also be used.

Generation of a Semantic Point Cloud Map

The present disclosure provides a method and system to generate a semantic point cloud map by associating sematic data generated from soft data, in the form of human generated data, with a raw point cloud map generated from sensor data (also known as hard data) collected by physical sensors such as LiDAR. An AD ontology, also sometimes known as a knowledge graph, is used to associate the semantic data with the sensor data. The process of associating semantic data with sensor data may comprise fusing or combining the semantic data with the sensor data using techniques described below and herein. The AD ontology is designed by ontology and AD domain professionals, the specifics of which are outside the scope of the present disclosure. The predefined AD ontology is used by the method and system of the present disclosure to generate a semantic point cloud map. The present disclosure uses a sensor fusion-based model to associate a set of data points of a raw point cloud map with a label that is semantically linked to the set of data points of the raw point cloud map through the sematic data (which is structured data) generated from soft data (which is unstructured data) received from a human. The sensor fusion-based model uses sensor fusion algorithms/techniques/tools such as ontologies to fuse the sensor data originating from different modalities.

The computer vision system 300 loads a primary (or main) point cloud map into memory, receives sensor data from sensors, such as EM wave based sensors 110 and possibly vehicle sensors 111, and stores the sensor data in the memory 126, for example in a buffer. The primary point cloud map point is a large scale, comprehensive point cloud map having a particular area of coverage that is larger than which can be generated by sensors of the vehicle 105, such as EM wave based sensors 110 and possibly vehicle sensors 111. The area of coverage could be a city, state or province, country, group of countries or region, or global. The primary point cloud map point may be provided by manufacturer of the vehicle 105 for use by the computer vision system 300 or downloaded by a data provider. The computer vision system 300 processes the sensor data to generate a local point cloud map of the environment surrounding the vehicle 105 which has a substantially smaller scope of coverage limited by the FOV of the EM wave based sensors 110, typically about 200-300 m. The computer vision system 300 also receives voice inputs from an HMI, processes the voice inputs to generate soft data, processes the soft data to generate semantic data, and processes the stored sensor data using the semantic data to reduce the size of the local point cloud map generated from the sensor data. Next, the reduced local point cloud map generated from the sensor data and semantic data is matched to the primary point cloud map, and the matching data points are annotated with the semantic labels.

Figure 3:
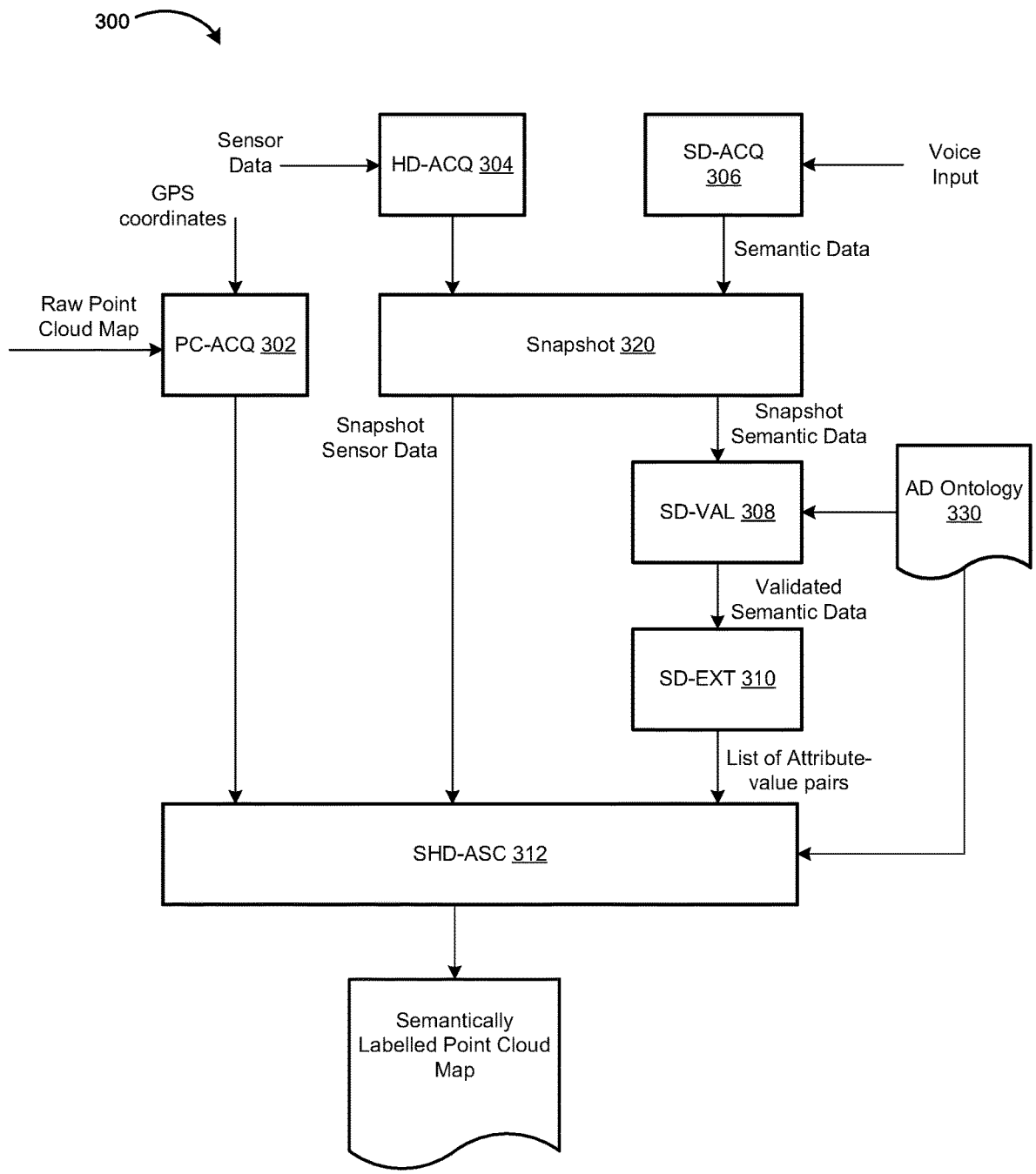
FIG. 3 is a schematic block diagram of a semantic point cloud map generating module of a computer vision system for generating a semantic point cloud map in accordance with one example embodiment of the present disclosure.

Referring to FIG. 3 a schematic block diagram of the SPCMG module 174 of the computer vision system 300 for generating a semantic point cloud map in accordance with one example embodiment of the present disclosure will be described. FIG. 3 illustrates a plurality of interconnected functional modules of the SPCMG module 174 in accordance with one example embodiment of the present disclosure. The modules of the SPCMG module 174 includes instructions that execute or run on one or more processing units or processor system 102, such as a CPU or GPU, or a combination thereof. The modules of the SPCMG module 174 comprise a point cloud map acquisition (PC-ACQ) module 302, a hard data acquisition (HD-ACQ) module 304, a soft data acquisition (SD-ACQ) module 306, soft data validation (SD-VAL) module 308, a soft data extraction (SD-EXT) module 310 and a soft data/hard data association (SHD-ASC) 312.

The SPCMG module 174 is activated in response to activating or initiating a sematic point cloud map learning mode of the computer vision system 300 of the vehicle 105 by for example, an operator, such as a driver or passenger of the vehicle 105. The description of the operation of the modules of the SPCMG module 174 below is within the context of the sematic point cloud map learning mode being active unless otherwise noted.

The PC-ACQ module 302 loads the primary point cloud map from persistent memory, such as memory 126 or external storage such as in the remotely accessible network resources 250, and stores the primary point cloud map in RAM 122 or other memory as a run-time data. Alternatively, the PC-ACQ module 302 incrementally accesses the primary point cloud map if the entire map cannot be loaded into memory. The input to the PC-ACQ module 302 is a path to the point cloud map file (e.g., either locally in the memory 126 or remotely in the network resources 250) as well as current GPS coordinates from the satellite receiver 132. The output of the PC-ACQ module 302 is a part of the primary point cloud map centered or otherwise close to the current GPS coordinates. A part of the primary point cloud map is used because the entire primary point cloud map is typically too large to fit in regular memory sizes. As a result, memory management is performed for the primary point cloud map. However, in other embodiments the entire primary point cloud map could be used if the memory capacity is very large.

The HD-ACQ module 304 constantly and continuously obtains synchronized real-time data of all relevant sensors (e.g., LiDAR 114, camera 112, and GPS/IMU 118) and stores a fixed length buffer of the real-time data of all relevant sensors as sensor data 182 in memory 126 (FIG. 2), for example, in a buffer. The stored sensor data is time stamped with a time of recording. The input of the HD-ACQ module 304 is the sensor data and the output of the HD-ACQ module 304 is a buffer with a length that ensures availability of all the sensor data.

Figure 5A:
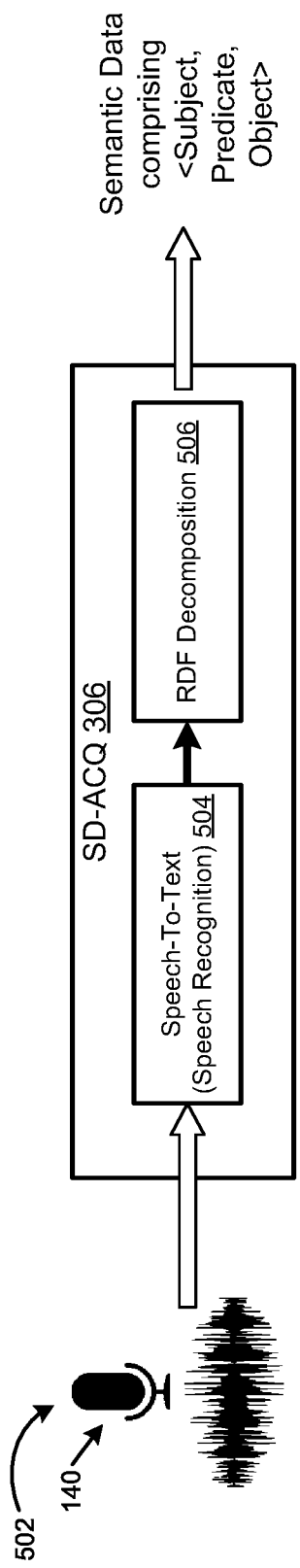
FIGS. 5A and 5B are block diagrams of a soft data acquisition module of the computer vision system of FIG. 3 in accordance with example embodiments of the present disclosure.

The SD-ACQ module 306 receives speech or voice inputs via a human-machine interface device (HMD) 502 of the vehicle control system 115. The HMD 502 for receiving the speech or voice inputs may comprise one or more microphones 140 with the SD-ACQ module 306 of the computer vision system 300 receiving speech or voice inputs received by the one or more microphones 140. Speech or voice input is considered to be more expedient, efficient and safer than other forms of input for the method and system of the present disclosure given the speed and timeliness with which speech or voice input can be provided at a negligible adverse impact on driver attention, leading to negligible driver distraction, if any. However, in other embodiments the HMD 502 for receiving the soft data may comprise a touchscreen 136 with the SD-ACQ module 306 of the computer vision system 300 receiving soft data in the form of touch inputs received by touchscreen 136. FIG. 5A is a block diagram of the SD-ACQ module 306 in accordance with one example embodiment of the present disclosure. The SD-ACQ module 306 listens for and receives speech or voice inputs via one or more microphones 140 of the HMD 502. The speech or voice inputs can be received from either a driver or passenger, or possibly a combination thereof. A microphone 140 may be provided and dedicated to each seating position in the vehicle 105, allowing voice input from a designated seating position or possibly a combination of seating positions to be acquired as the soft data. Directional microphones or audio filtering may be used to isolate the speech or voice input from a particular seating position from any speech or voice inputs from the other seating positions.

The SD-ACQ module 306 comprises a speech-to-text (also known as voice-to-text) module 504 that receives speech or voice input from the HMD 502 (i.e., microphone(s) 140) and performs speech recognition and speech-to-text synthesis on the voice input to convert received speech or voice input into text. The output of the speech-to-text module 504 is text generated from the received voice input, which is called a "soft data observation". The soft data observation is time stamped with a time of recording.

The synthesized (generated) text ("soft data observation") output from the speech-to-text module 504 is received as the input for a text decomposition module of the SD-ACQ module 306, such as a resource description framework (RDF) decomposition module 506. The RDF decomposition module 506 performs text decomposition upon the synthesized (generated) text ("soft data observation") using natural language processing (NLP) techniques to generate semantic data indicative of semantic information that includes a semantic label. An example of an NLP tool for performing NLP is FRED, the details of FRED are available at http://wit.istc.cnr.it/stlab-tools/fred/ and http://semantic-web-journal.org/system/files/swj1379.pdf, the content of which is incorporated herein by reference.

Figure 5B:
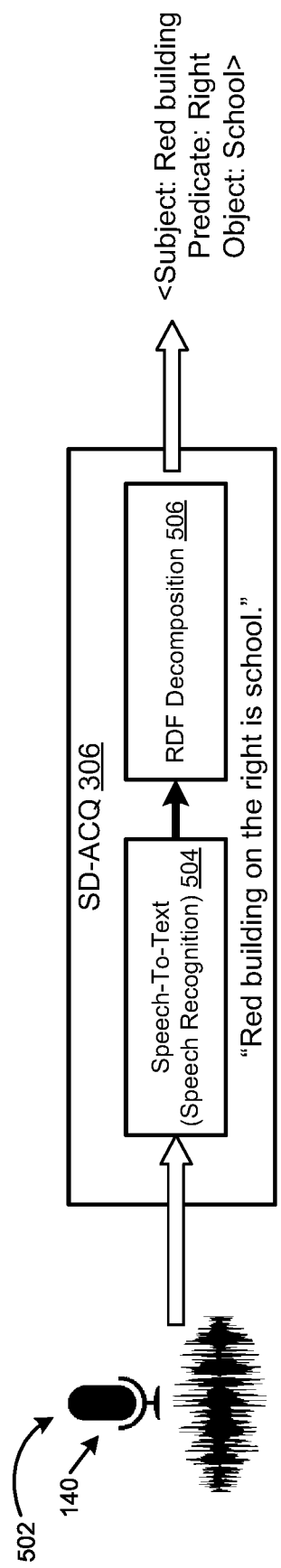

The RDF decomposition module 506 performs text decomposition upon the soft data observation to decompose the synthesized text into semantic data in the form of a RDF triplet in the form of <subject, predicate, object> using NLP techniques that determine which part of the text is a subject, a predicate, and an object, discarding other words. Each of the subject, predicate, and object may comprise one or more words. The subject and predicate of the RDF triplet are used to localize the coordinate for a semantic label within the local point cloud map (PCM) generated by the sensors 110 whereas the object of the RDF triplet is the semantic label. This is illustrated by FIG. 5B in which the observation "Red building on the right is school" is decomposed in the RDF triplet <Subject: Red building, Predicate: Right, Object: School>. The RDF triplet is then input to the SD-VAL module 308 for validation of the semantic data and the validated semantic data is input to the SD-EXT module 310 for extraction of attribute values, as described below. In this example, for the semantic data to be valid the AD ontology 330 needs to contain the individuals ("Right" as an instance of the class "Direction", "building" as an instance of the class "Structure", and "Red" as an instance of the class "Color") to be able to validate the subject and predicate terms, as described more fully below.

The SD-ACQ module 306 assists in transforming soft data into structured data (called semantic data in the present disclosure) and so that soft data can be associated (e.g., combined or fuse) with sensor data. SD-ACQ transforms speech or voice inputs (e.g., speech waveforms received from microphone(s) 140) into a soft data observation (e.g. text) and generates a string of words (e.g. semantic data) from the soft data observation using the RDF decomposition module 506.

In response to a speech or voice input being received, a snapshot 320 of the local environment of the vehicle 105 (i.e., current sensor data in the buffer stored by HD-ACQ module 304) and the semantic data generated from soft data observations is stored in memory.

The SD-VAL module 308 receives the snapshot of the semantic data and validates the snapshot of semantic data according to a particular domain-specific structure, which is called an "ontology". Within the context of the present disclosure, the particular domain-specific structure is the autonomous driving domain and the ontology is an autonomous driving (AD) ontology 330. The structure of the AD ontology 330 will be briefly described. As noted above, the AD ontology 330 is designed by ontology and AD domain professionals, the specifics of which are outside the scope of the present disclosure. In addition, the specific structure and content of the AD ontology 330 may vary between embodiments. The AD ontology 330 is a representation, formal naming, and definition of the categories, properties, and relations between the concepts, data, and entities that substantiate the autonomous driving domain. The AD ontology 330 provides a means to organize the semantic data in the autonomous driving domain when generating a semantic point cloud map. If a particular observation includes a subject or predicate that are irrelevant to the autonomous driving domain, the observation will be discarded. In particular, if any of the words in the subject and predicate are not found in the AD ontology 330, the observation will be discarded. The output of the SD-VAL module 308 is a determination as to whether the semantic data is valid (i.e., relevant).

Although the structure and content of the AD ontology 300 may vary between embodiments and the ontology designers, the AD ontology 330 typically describes classes, individuals, attributes and relationships. Classes are sets, collections, concepts, types of objects, or kinds of things. Individuals are instances or objects that are instantiated from a class. Attributes are aspects, properties, features, characteristics, or parameters that individuals (instances, objects) or classes can have. Relationships are the ways in which classes and individuals can be related to one another.

The AD ontology 330 may also describe function terms, restrictions, rules, axioms, and events. Function terms are complex structures formed from certain relations that can be used in place of an individual term in a statement. Restrictions are formally stated descriptions of what must be true in order for some assertion to be accepted as input. Rules are statements in the form of an if-then (antecedent-consequent) sentence that describe the logical inferences that can be drawn from an assertion in a particular form. Axioms are assertions (including rules) in a logical form that together comprise the overall theory that the ontology describes in its domain of application. Events change attributes or relations.

It will be understood that not any semantic data is valid. The computer vision system 300, via the SD-VAL module 308 and SD-EXT module 310, distinguishes between relevant (valid) and irrelevant (invalid) semantic data generated from soft data observations made by the human operator to improve overall efficiency and to reduce or avoid errors in annotation. The classes of words in a particular RDF triplet generated from the soft data observations, and are determined for later processing and use by the SHD-ASC module 312.

The SD-VAL module 308 determines whether the semantic data is valid by comparing the words to the AD ontology 330. The SD-VAL module 308 determines whether the semantic data is valid by querying the AD ontology 330 on all the words included in the subject and predicate terms of the RDF triplet. If each word in the subject and predicate terms of the RDF triplet corresponds to an instance defined in AD ontology 330, the semantic data is valid.

The SD-EXT module 310 starts processing semantic data in response to the semantic data being validated by the SD-VAL module 308. The SD-EXT module 310 parses the semantic data by running multiple queries in the AD ontology 330, extracts a list of attribute values from the semantic data and determines a class corresponding to each attribute value to generate a list of attribute-value pairs. The subject and predicate terms are queried on the AD ontology 330 as if asking the AD ontology 330 "What is <word in subject or predicate>?" The responses can be considered as filters that will be applied to sensor data.

The SD-EXT module 310 determines an attribute-value pair for each word in the subject and predicate terms of the RDF triplet, and stores the attribute-value pair in a list of attribute-value pairs in memory 126 (FIG. 2). An attribute is a class and a value is an instance of the class. For example, referring again to FIG. 5B in which the observation "Red building on the right is school" is decomposed in the RDF triplet <Subject: Red building, Predicate: Right, Object: School>, the word "Right" is an instance of class "Direction", the word "building" is an instance of the class "Structure", and the word "Red" is an instance of class "Color". The corresponding attribute-value pairs are Color: Red, Structure: building, Direction: Right.

Figure 6:
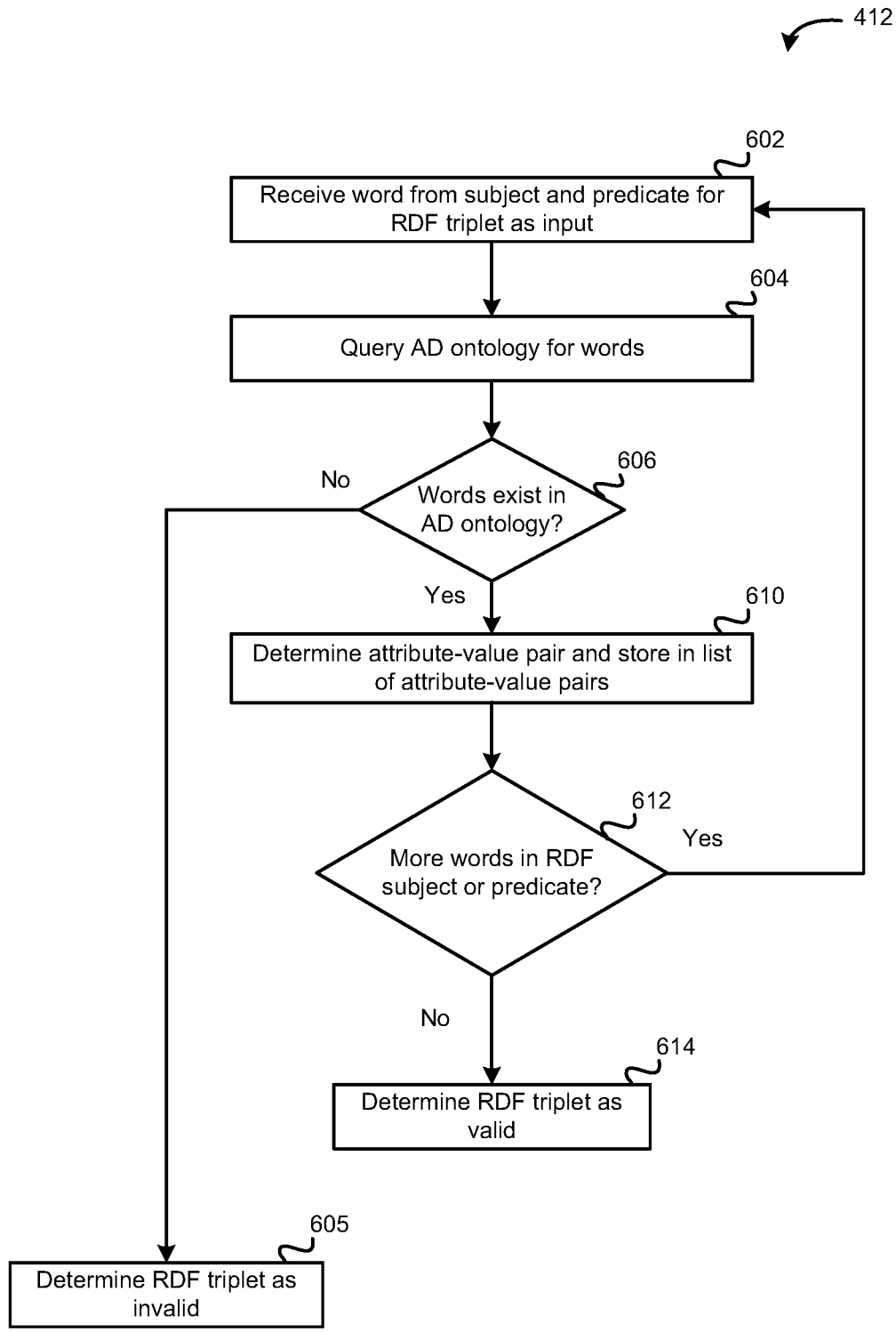
FIG. 6 is a flowchart of a method of validating semantic data and determining attribute-value pairs from semantic data in accordance with one example embodiment of the present disclosure.

FIG. 6 is a flowchart of a method 600 of validating semantic data and determining attribute-value pairs from a valid semantic data in accordance with one example embodiment of the present disclosure. At least parts of the method 600 are carried out by software executed by the processor system 102 of the vehicle control system 115. At operation 602, semantic data comprising an RDF triplet is received by the SD-VAL module 308 from the SD-ACQ module 306. At operation 604, a word in the subject term and a word in the predicate term of the RDF triplet is queried against the AD ontology 330. Next, at operation 606 the SD-VAL module 308 determines whether an individual entity is defined in AD ontology 330 for the words. The subject and predicate terms extracted from the RDF triplet return valid responses when queried on the AD ontology 330 when the semantic data is valid. The response is valid when a class/instance in the AD ontology 330 represents all the terms of subject and predicate.

After determining that either the word in the subject term or the word in the predicate term of the RDF triplet does not exist in the AD ontology 330, the semantic data is determined to be invalid in operation 608, and the method 600 ends.

After determining that both the word in the subject term and the word in the predicate term of the RDF triplet exist in the AD ontology 330, the words are output to the SD-EXT module 310 which at operation 610 determines an attribute-value pair from the RDF triplet, and stores the attribute-value pair in a list of attribute-value pairs in memory.

It is then determined whether any words are remaining in the subject term or the predicate term of the RDF triplet (operation 612). If any words are remaining in the subject term and/or predicate term of the RDF triplet, processing returns to operation 602. If no words are remaining, the semantic data is determined to be valid in operation 614, and the method 600 ends.

The SHD-ASC module 312 associates attribute-value pairs determined from the semantic data by the SD-EXT module 310 with the sensor data and links the attribute-value pairs to corresponding coordinates in the local point cloud map with the assistance of the AD ontology 330.

Figure 7A:
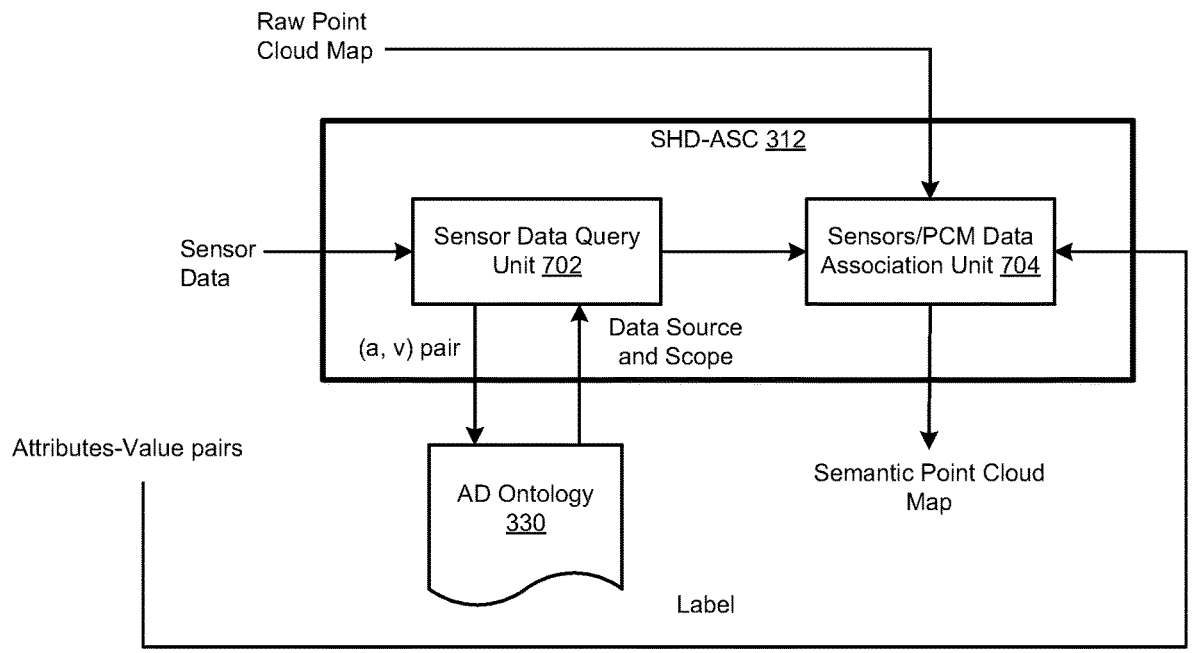
FIGS. 7A and 7B are block diagrams of a soft data/hard data association module of the computer vision system of FIG. 3 in accordance with example embodiments of the present disclosure.
Figure 7B:
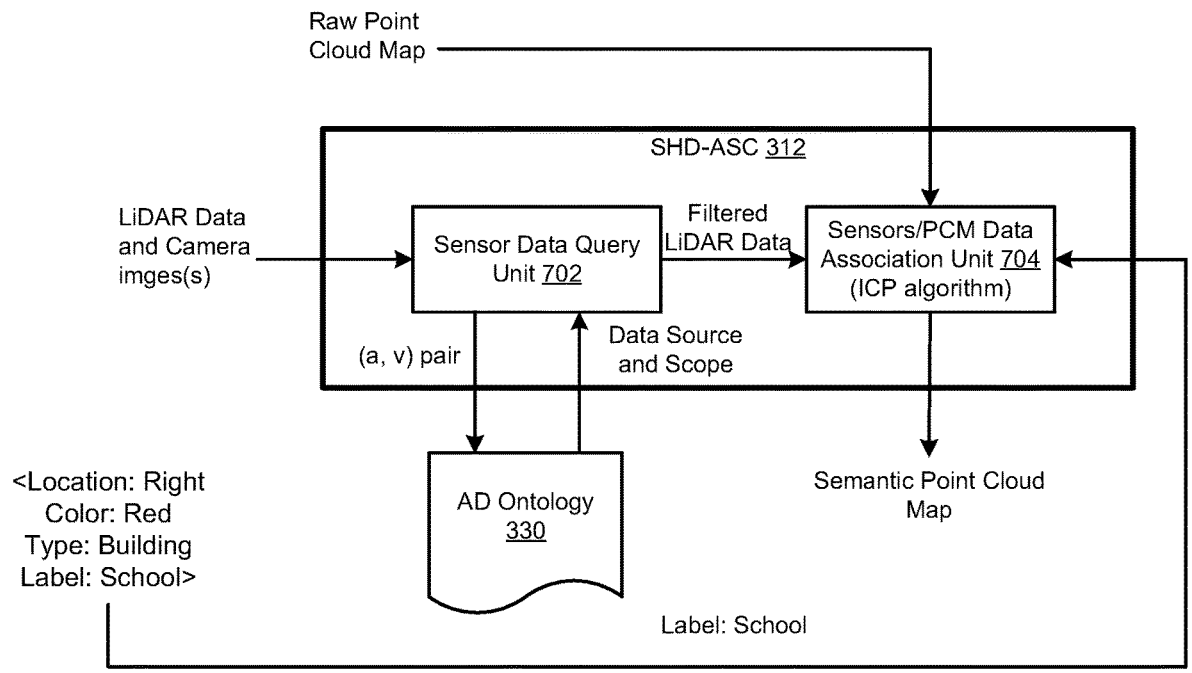

FIG. 7A is a block diagram of the SHD-ASC module 312 of the computer vision system 300 in accordance with one example embodiment of the present disclosure. FIG. 7B is an example instance of the SHD-ASC module 312 of FIG. 7A with LiDAR data and camera images as the sensor data, and a list of attribute-value pairs comprising <Location: Right, Color: Red, Type: Building, Label: School>. The SHD-ASC module 312 identifies the respective part of sensor data represented by semantic data generated from a particular soft data observation and associates (e.g., fuses or combine) the corresponding coordinates of the local point cloud map based on the semantic data.

As shown in FIG. 7A, the stored snapshot 320 of sensor data along with the attribute-value pairs determined for semantic data generated from the particular soft data observation by the SD-EXT module 310 are provided as inputs to a sensor data query unit 702. The sensor data query unit 702 passes each attribute-value pair to the AD ontology 330 stored in memory, and queries the AD ontology 330 about the originating source (e.g., the EM wave based sensor 110 or possibly vehicle sensor 111). The sensor data query unit 702 receives a data source and scope identification and applies this data as criteria to filter the input sensor data (i.e., LiDAR data) to localize the coordinate(s) to be associated with the label(s). For example, referring to the example of FIG. 7B, when sensor data query passes the attribute-value pair ("color", "red") to the AD ontology 330, the sensor data query unit 702 may receive "Image" or "Camera" as the corresponding data source. This means only the red parts of the camera image need to be used for point cloud map coordinate matching. The matching point cloud map coordinate(s) can be determined by registering a LiDAR point cloud map to a camera image, and considering only the coordinates corresponding to red regions of the camera image. A similar approach can be used for other attribute-value pairs. Applying this process, a LiDAR-based local point cloud map can be filtered until matching point cloud map coordinates are obtained that represent the particular observation.

The filtered point cloud map coordinates output by the sensor data query unit 702 is received as input by a sensor/point cloud map (PCM) data association unit 704, and are matched with the primary point cloud map using a point cloud matching technique, such as the iterative closest point (ICP) algorithm which can be employed to minimize the difference between two clouds of points. Lastly, the particular semantic label(s) are associated with the matching points in the point cloud map for semantic data generated for the particular soft data observation. The output of SHD-ASC module 312 is a semantic point cloud map (e.g. a point cloud map that has been semantically labeled). The semantic point cloud map may comprise a point cloud map with an enhanced data layer that defines the semantic labels for various points. Alternatively, the enhanced data layer may be stored separate from the point cloud map. Each coordinate may have more than one label, and different labels for a particular coordinate may be generated in the same or different sessions. If a particular coordinate of the semantic point cloud map already has a label then a new label will be added to it. The SHD-ASC 312 stores the association between semantic label(s) and the matching coordinate(s) of the point cloud map in memory of the computer vision system 300.

The SHD-ASC 312 focuses data association on the scope of the primary point cloud map associated with the semantic data generated from the particular soft data observation, and is thereby able to relate semantic data and sensor data using the AD ontology 330 to perform point cloud map annotation using semantic data generated from soft data observations.

Figure 4:
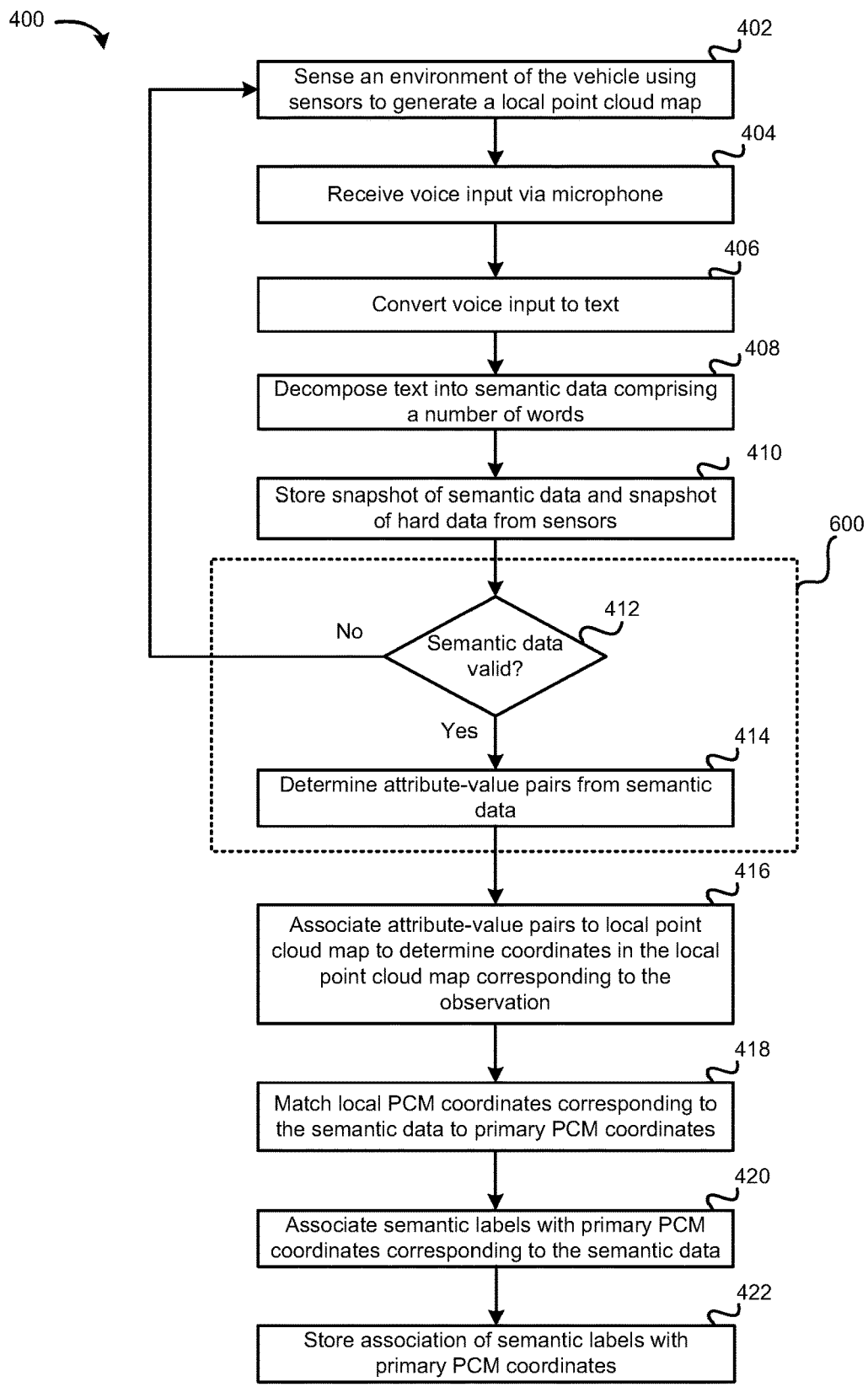
FIG. 4 is a flowchart of a method of generating a semantic point cloud map in accordance with one example embodiment of the present disclosure.

Referring to FIG. 4, a method 400 of semantic annotation of a point cloud map using soft and sensor data fusion in accordance with one example embodiment of the present disclosure will be described. At least parts of the method 400 are carried out by software executed by the processor system 102 of the vehicle control system 115. The method 400 is performed when a sematic point cloud map learning mode of the computer vision system 300 of the vehicle 105 is activated (or engaged) by an operator, such as a driver. The sematic point cloud map learning mode may be activated through interaction with a human-machine interface device (HMD) 502 (FIG. 5A) of the vehicle control system 115, such as voice activation via a pre-defined keyword combination or other user interaction, such as touch activation via a GUI of the computer vision system 300 displayed on the touchscreen 136.

At operation 402, the HD-ACQ module 304 of the computer vision system 300 receives sensor data by sensing an environment of the vehicle 105 via sensors, such as EM wave based sensors 110 and possibly vehicle sensors 111. The sensor data is stored in a buffer of the computer vision system 300 or vehicle control system 115. The sensor data received by the computer vision system 300 provides a local point cloud map of the environment surrounding the vehicle 105.

At operation 404, the SD-ACQ module 306 of the computer vision system 300 receives speech or voice input received by the one or more microphones 140.

At operation 406, the speech-to-text module 504 of the SD-ACQ module 306 receives the voice or speech input and performs speech-to-text synthesis on the voice input to generate text (e.g. the soft data observation) comprising a plurality of words from the speech or voice input (e.g., speech data or voice data).

At operation 408, the RDF decomposition module 506 of the SD-ACQ module 306 performs text decomposition upon the generated text (e.g. the soft data observation) to decompose the generated text into semantic data comprising keywords, such as an RDF triplet in the form of <subject, predicate, object> using NLP techniques that determine which part of the text is a subject, a predicate, and an object, discarding other words. Each of the subject, predicate, and object may comprise one or more words. The subject and predicate of the RDF triplet are used to localize the coordinate for a semantic label within the local point cloud map generated by the sensors whereas the object of the RDF triplet is the semantic label.

At operation 410, the snapshot 320 of the local environment of the vehicle 105 (i.e., current physical sensor data in the buffer stored by HD-ACQ module 304) and the snapshot of semantic data (e.g. current sematic data generated by the SD-ADQ module 306) is stored in memory so that if semantic data validation is successful, sensor data having the same time stamp as the semantic data is available for later processing.

At operation 412, the SD-VAL module 308 determines whether the snapshot of the semantic data (hereinafter referred to as the semantic data) is valid by comparing the words to the AD ontology 330. The SD-VAL module 308 determines whether the semantic data is valid by querying the AD ontology 330 on all the words included in the subject and predicate terms of the RDF triplet. If each word in the subject and predicate terms of the RDF triplet corresponds to an instance defined in AD ontology 330, the semantic data is valid.

At operation 414, in response to the semantic data being determined to be valid, each word in the subject and predicate terms of the RDF triplet is extracted as an attribute value for the subject and predicate terms of the RDF triplet. The extracted attribute value is queried against the AD ontology 330 to determine a respective class for the subject and predicate terms of the RDF triplet corresponding to the attribute values to generate a list of attribute-value pairs. Instances, attributes, and relationships defined by the AD ontology 330 and the meanings of valid instances are also interpreted by the SD-EXT module 310 according to an AD domain-specific data flow. Thus, the SD-EXT module 310 determines an attribute-value pair from the RDF triplet for each word in the subject and predicate terms, and stores the attribute-value pair in a list of attribute-value pairs in memory. An attribute is a class and a value is an instance of the class.

In response to the semantic data being determined to be invalid, the semantic data is discarded. In particular, if any of the words in the subject and predicate are not found in the AD ontology 330, the semantic data will be discarded. The processing then returns to operation 402. Alternatively, in other embodiments rather than discarding the semantic data, the computer vision system 300 may notify the user of the invalid soft data observation and prompt the user to retry the soft data observation input, with processing returning to operation 404 so that the sensor data from operation 402 is persisted between attempts and re-used in subsequent attempts for the same observation for the same sensor data. This may be advantageous because the location and/or position of the vehicle 105 may have changed between attempts. The notification and prompt may be provided by the one or more speakers 138 with the observation being re-captured by the one or more microphones 140 of the HMD 502 of the vehicle control system 115 for expediency, efficiency and reducing driver distraction.

Alternatively, in yet another embodiment potential attribute-value pairs may be presented to the user when the attribute the words in the subject and predicate are close to but do not match words found in the AD ontology 330. For example, a match rating (e.g., percentage) may be determined when the extracted words in the subject and predicate are not identical to the words found in the AD ontology 330, i.e. when the matching is less than 100%. The matching rating (or likelihood of match) may be determined using any suitable NLP metrics or parameters. The potential attribute-value pairs presented to the user may be selecting from the AD ontology 330 based on the same NLP metrics or parameters. A predetermined number of the top matching attribute-value pairs having a likelihood of match above a match threshold may be presented to the user. The match threshold may be set high to avoid presenting the user with spurious recommendations when the words in the subject and predicate do not match words found in the AD ontology 330. For example, the match threshold may be over 75%, possibly over 85%, possibly over 90% or more. The potential attribute-value pairs may be provided by the one or more speakers 138 with the selection, if any, of the potential attribute-value pairs being captured by the one or more microphones 140 of the HMD 502 of the vehicle control system 115 for expediency, efficiency and reducing driver distraction. Alternatively, the touchscreen 136 may be used.

Figure 8:
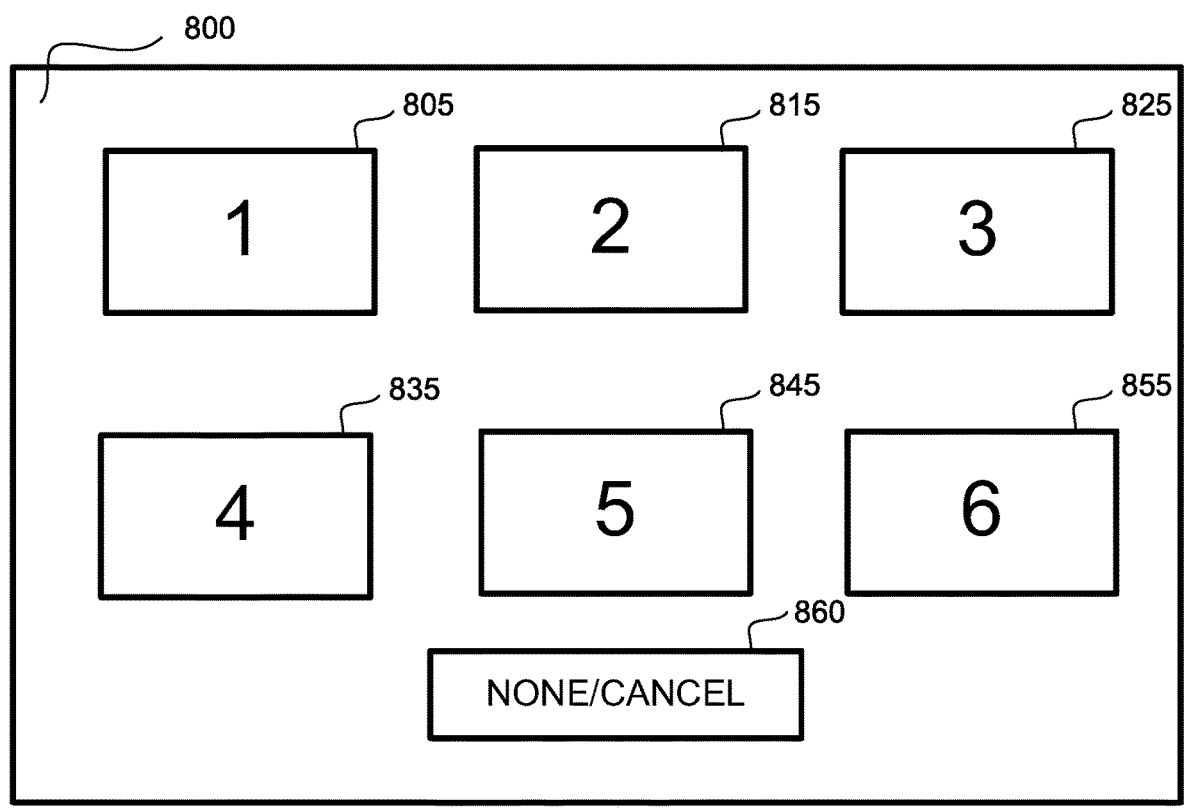
FIG. 8 is an example user interface screen for selecting between potential attribute-value pairs in accordance with an example embodiment of the present disclosure.

FIG. 8 is an example user interface screen 800 for selecting between potential attribute-value pairs in accordance with an example embodiment of the present disclosure that can be displayed on the touchscreen 136. The user interface screen 800 includes a plurality of user interface (UI) buttons (or boxes) 805, 815, 825, 835, 845 and 855 as well as a none/cancel button 860. Each of the UI buttons 805-855 includes potential attribute-values pairs based the respective likelihoods of match. The user need only touch the matching UI button 805-855 corresponding to a set of attribute-value pairs to select the intended attribute-value pairs if shown or touch the none/cancel button 860 if the intended attribute-value pairs are not shown.

At operation 416, the SHD-ASC module 312 associates the sensor data with the attribute-value pairs to determine coordinates within the local point cloud map generated from the sensor data captured by the sensors that correspond to the semantic data. The attribute-value pairs are used to localize the coordinates for the semantic label within the local point cloud map. The SHD-ASC module 312 processes the stored sensor data and semantic data to reduce the size of the local point cloud map generated from the sensor data. For example, a LiDAR point cloud map generated by the LiDAR units 114 may be registered against one or more images captured by the cameras 112 to assign LiDAR-based coordinates to pixels in the one or more images.

A mapping of pixels to LiDAR-based coordinates may be generated by the SHD-ASC module 312 and stored in memory. The mapping may be based on camera imaging parameters (such as image resolution, focal distance, etc.), the mounting position and alignment of the cameras 112, which is known to the computer vision system 300. The mapping may also be based on depth data/information, for example, when multiple images with overlapping FOVs are obtained. Depth information may be obtained using correspondence data/information locating environmental feature in different images, and finding an intersection point in which the environmental features appears and applying triangulation (also referred to as reconstruction) techniques using epipolar geometry. Epipolar geometry is commonly used in computer stereo vision. When two images are obtained of a three dimensional (3D) scene from two distinct positions, there are a number of geometric relations between the 3D points and the projections of the 3D points onto the two dimensional (2D) images lead to constraints between the image points. These relations are derived by approximating each of the cameras 112 by the pinhole camera model, the details of triangulation techniques being outside the scope of the present disclosure.

Next, the attribute-value pairs are associated with the image data (e.g., pixels) of the one or more images captured by the cameras 112 to obtain a subset of the image data corresponding (i.e., relevant) to the observation. The mapping of pixels to LiDAR-based coordinates is then used to determine a subset of the LiDAR-based coordinates corresponding to the subset of the image data corresponding to the observation.

At operation 418, the SHD-ASC module 312 matches the reduced local point cloud map (or coordinate data) to the primary point cloud map (or coordinate data). The point cloud map coordinates may be matched using a point cloud matching technique, such as the ICP algorithm which can be employed to minimize the difference between two clouds of points. It will be appreciated that the local point cloud and the primary point cloud map have a common coordinate system. The local point cloud and the primary point cloud map may be generated by the same type of sensor, such as LiDAR in some embodiments.

At operation 420, the SHD-ASC module 312 associates (e.g. fuses or combines) semantic labels generated from the objects of the RDF triplets with the matching set of data point(s) (coordinate(s)) of the primary point cloud map. The output of SHD-ASC module 312 is a semantic point cloud map. The semantic point cloud map may comprise a point cloud map with an enhanced data layer that defines the semantic labels for various data points. Alternatively, the enhanced data layer may be stored separate from the point cloud map.

At operation 422, the SHD-ASC module 312 stores the association between semantic labels and coordinate(s) of the point cloud map in the memory of the computer vision system 300.

General

The coding of software and software modules for carrying out the above-described methods described is within the scope of a person of ordinary skill in the art having regard to the present disclosure. Executable instructions of software code or and software modules for execution by a processor system to perform the above-described methods may be stored in a machine-readable medium as the memory of the vehicle control system. The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified. Although a processor system is described as performing many of the operations of the methods described herein, one or more dedicated digital signal processors (DSPs), graphical processing units (GPU), or image processors may be used to perform some of the described operations. The particular processing entity that performs the described operations is not intended to be restrictive to the present disclosure.

The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above-described memory types are example only, and are thus not limiting as to the types of memory usable for storage of a computer program.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, GPUs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer vision system, comprising:
a processor system;
a microphone coupled to the processor system;
a plurality of sensors coupled to the processor system, the plurality of sensors configured to sense an environment surrounding a vehicle carrying the computer vision system; and
a memory coupled to the processor system, the memory tangibly storing thereon executable instructions that, in response to execution by the processor system, cause the computer vision system to:

sense the environment of the vehicle via the plurality of sensors to generate sensor data, the sensor data being associated with a first time stamp;

receive a voice input via the microphone, the voice input being associated with a second time stamp;

convert the voice input into text via speech-to-text synthesis;

decompose the text into semantic data comprising a number of keywords in the form of a Resource Description Framework (RDF) triplet in the form of <subject, predicate, object> by natural language processing (NLP) that determine which part of the text is the subject, the predicate, and the object;

determine whether the keywords of the semantic data are present in an autonomous ontology; and in response to the keywords of the semantic data being present in the AD ontology:

determine coordinates of a point cloud map corresponding to the semantic data, wherein the point cloud map comprises a set of data points, each data point in the point cloud map comprising a three-dimensional coordinate in a three-dimensional coordinate system, wherein the point cloud map is associated with a third time stamp temporally corresponding to the second time stamp associated with the voice input, and wherein the determined coordinates of the point cloud map corresponding to the semantic data are coordinates of the point cloud map that are determined to match the subject and predicate terms of the RDF triplet and the sensor data;

generate an association between a semantic label generated from the object in the RDF triplet and data points of the point cloud map at the determined coordinates of the point cloud map; and store the association in the memory of the computer vision system.

2. The computer vision system of claim 1, wherein each of the subject, predicate, and object comprise one or more words.

3. The computer vision system of claim 1, wherein the keywords of the semantic data comprise all of the words of the subject and predicate.

4. The computer vision system of claim 1, wherein the executable instructions, in response to execution by the processor system, cause the computer vision system to:

generate the point cloud map from the sensor data;

wherein the executable instructions, in response to execution by the processor system, cause the computer vision system to match the determined coordinates of the point cloud map corresponding to the semantic data with coordinates of a primary point cloud map which covers a larger geographic region than the point cloud map;

wherein the association between the semantic label and the determined coordinates is stored in association with the primary point cloud map.

5. The computer vision system of claim 1, wherein the executable instructions, in response to execution by the processor system, cause the computer vision system to:

determine an attribute-value pair from the RDF triplet for each word in the subject and predicate terms; and store each attribute-value pair in a list of attribute-value pairs in the memory of the computer vision system.

6. The computer vision system of claim 5, wherein the executable instructions to determine the coordinates of the point cloud map corresponding to the semantic data, in response to execution by the processor system, cause the computer vision system to:

associate the sensor data with the attribute-value pairs to determine coordinates of the point cloud map corresponding to the semantic data; and wherein the executable instructions, in response to execution by the processor system, cause the computer vision system to match the determined coordinates of the point cloud map corresponding to the semantic data with coordinates of a primary point cloud map, wherein the primary point cloud map covers a larger geographic region than the point cloud map.

7. The computer vision system of claim 6, wherein the determined coordinates of the point cloud map are matched with coordinates in the primary point cloud map using an iterative closest point (ICP) algorithm.

8. The computer vision system of claim 6, wherein the sensors comprise one or more electromagnetic (EM) wave based sensors that generate the sensor data used to generate the point cloud map and one or more cameras that generate one or more images of at least a part of the environment encompassed by the point cloud map, wherein the executable instructions to associate the sensor data with the attribute-value pairs to determine coordinates within the point cloud map that correspond to the semantic data, in response to execution by the processor system, cause the computer vision system to:

associate the attribute-value pairs with image data of the one or more images captured by the one or more cameras to obtain a subset of the image data that correspond to the semantic data; and determine a subset of the coordinates corresponding to the subset of the image data corresponding to the semantic data.

9. The computer vision system of claim 8, wherein the executable instructions, in response to execution by the processor system, cause the computer vision system to:

register the point cloud map generated from the sensor data generated by the one or more EM wave based sensors against the one or more images captured by the one or more cameras to assign coordinates to image data in the one or more images.

10. The computer vision system of claim 9, wherein the executable instructions to register the point cloud map generated from the sensor data generated by the one or more EM wave based sensors against the one or more images captured by the one or more cameras to assign coordinates to image data in the one or more images, in response to execution by the processor system, cause the computer vision system to:

generate a mapping of image data to EM wave based sensor coordinates; and wherein the subset of the coordinates corresponding to the subset of the image data corresponding to the semantic data is determined using the mapping of image data to EM wave based sensor coordinates.

11. The computer vision system of claim 8, wherein the one or more EM wave based sensors comprise one or more LiDAR units.

12. The computer vision system of claim 6, wherein the primary point cloud map covers a larger geographic region than the point cloud map and is stored in the memory of the computer vision system.

13. The computer vision system of claim 12, wherein the association between the semantic label and the determined coordinates is stored in association with the primary point cloud map.

14. The computer vision system of claim 1, wherein the executable instructions, in response to execution by the processor system, cause the computer vision system to:
output the point cloud map including the semantic label.

15. A method of generating a semantic point cloud map of an environment using a plurality of sensors of computer vision system of a vehicle, comprising:
sensing the environment of the vehicle via the plurality of sensors to generate sensor data, the sensor data being associated with a first time stamp;
receiving a voice input via a microphone, the voice input being associated with a second time stamp;
converting the voice input into text via speech-to-text synthesis;
decomposing the text into semantic data comprising a number of keywords in the form of a Resource Description Framework (RDF) triplet in the form of <subject, predicate, object> by natural language processing (NLP) that determine which part of the text is the subject, the predicate, and the object;
determining whether the keywords of the semantic data are present in an autonomous driving (AD) ontology; and
in response to the keywords of the semantic data being present in the AD ontology:
determining coordinates of a point cloud map corresponding to the semantic data, wherein the point cloud map comprises a set of data points, each data point in the point cloud map comprising a three-dimensional coordinate in a three-dimensional coordinate system, wherein the point cloud map is associated with a third time stamp temporally corresponding to the second time stamp associated with the voice input, and
wherein the determined coordinates of the point cloud map corresponding to the semantic data are coordinates of the point cloud map that are determined to match the subject and predicate terms of the RDF triplet and the sensor data;
generating an association between a semantic label generated from the object in the RDF triplet and data points of the point cloud map at the determined coordinates of the point cloud map; and
storing the association in a memory of the computer vision system.

16. The method of claim 15, wherein each of the subject, predicate, and object comprise one or more words.

17. The method of claim 15, wherein the keywords of the semantic data comprise all of the words of the subject and predicate.

18. The method of claim 15, further comprising:
generating the point cloud map from the sensor data;
matching the determined coordinates of the point cloud map corresponding to the semantic data with coordinates of a primary point cloud map which covers a larger geographic region than the point cloud map;
wherein the association between the semantic label and the determined coordinates is stored in association with the primary point cloud map.

19. A non-transitory machine readable medium having tangibly stored thereon executable instructions for execution by a processor system of a computer vision system, the computer vision system comprising a microphone and a plurality of sensors for sensing an environment surrounding a vehicle carrying the computer vision system and coupled to the processor system, wherein the executable instructions, in response to execution by the processor system, cause the computer vision system to:
sense the environment of the vehicle via the plurality of sensors to generate sensor data, the sensor data being associated with a first time stamp receive a voice input via the microphone, the voice input being associated with a second time stamp;
convert the voice input into text via speech-to-text synthesis;
decompose the text into semantic data comprising a number of keywords in the form of a Resource Description Framework (RDF) triplet in the form of <subject, predicate, object> by natural language processing (NLP) that determine which part of the text is the subject, the predicate, and the object;
determine whether the keywords of the semantic data are present in an autonomous driving (AD) ontology; and
in response to the keywords of the semantic data being present in the AD ontology:
determine coordinates of a point cloud map corresponding to the semantic data, wherein the point cloud map comprises a set of data points, each data point in the point cloud map comprising a three-dimensional coordinate in a three-dimensional coordinate system, wherein the point cloud map is associated with a third time stamp temporally corresponding to the second time stamp associated with the voice input, and wherein the determined coordinates of the point cloud map corresponding to the semantic data are coordinates of the point cloud map that are determined to match the subject and predicate terms of the RDF triplet and the sensor data;
generate an association between a semantic label generated from the object in the RDF triplet and data points of the point cloud map at the determined coordinates of the point cloud map; and
store the association in a memory of the computer vision system.

* * * * *